Dec. 27, 1938.   G. R. FONDA ET AL   2,141,905
FLUORESCENT LAMP AND FLUORESCENT MATERIAL THEREFOR
Filed Dec. 17, 1936
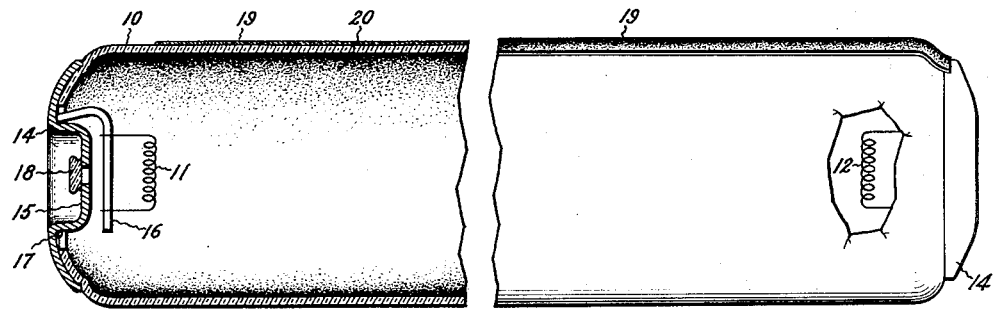
Inventors:
Gorton R. Fonda,
Ralph P. Johnson,
by Harry E. Dunham
Their Attorney.

Patented Dec. 27, 1938

2,141,905

UNITED STATES PATENT OFFICE 2,141,905

FLUORESCENT LAMP AND FLUORESCENT MATERIAL THEREFOR

Gorton R. Fonda and Ralph P. Johnson, Schenectady, N. Y., assignors to General Electric Company, a corporation of New York Application December 17, 1936, Serial No. 116,399

6 Claims. (Cl. 134—47)

The present invention relates to fluorescent lamps and comprises in particular a new fluorescent material, which is capable of emitting light in the red spectral range.

In accordance with our present invention, we have provided a fluorescent material containing magnesium and silicon in chemical combination with oxygen.

Although the product prepared in accordance with our invention possibly may not constitute a silicate in the strict chemical sense, it will be so termed herein for convenience.

The accompanying drawing shows in longitudinal section a lamp in which magnesium silicate may be caused to emit light by fluorescence.

In preparing the magnesium silicate fluorescent material an intimate mixture of magnesium oxide (MgO) and silica ($SiO_2$) in molecular proportions by weight, together with a suitable exciter, such as finely-divided manganese compound, is heat treated. The manganese may be introduced as oxide, nitrate, carbonate, or other compound, which is capable of breaking down when heated to yield some relatively simple compound capable of diffusing into the reaction mixture. It should constitute less than 2 per cent by weight of the silicate mixture, ordinarily within the range of about 0.4 to 1.5 per cent. The mixture may be fired to a temperature of about 1250° C. for about an hour or longer, although lower temperatures also may be used. The condition of firing should be such as to bring about an intimate diffusion of all the ingredients. The composition of the final product includes probably a mixture of the metallic silicates with some free silica and possibly also some free metallic oxides. Too extensive firing is undesirable because it yields a product of somewhat lower fluorescence intensity.

The product is applied as a coating on the interior surface of an electronic gas ionization device, such for example, as a positive column type of lamp, as shown in the drawing. The coating should be thick enough to efficiently produce light by fluorescence without, however, being so thick as to be opaque.

The lamp shown in the drawing is illustrative only of lamps in which our invention may be used. Other known forms of gaseous discharge lamps may be used. The lamp illustrated comprises a tubular glass container 10 provided at opposite ends with filamentary thermionic electrodes 11 and 12. These electrodes may consist of finely-coiled tungsten wire, which is in turn coiled into a spiral as shown. The finer coil of the wire constituting the spiral has not been indicated in the drawing. The electrodes, which operate at a temperature of thermionic electron emission, are coated with a suitable emission-enhancing material, such as barium oxide.

Although the electrode filaments may be mounted in various well known ways, the drawing shows a construction, such as shown and claimed in applications, Serial No. 3,334, filed January 24, 1935, by Harold D. Blake, and Serial No. 75,772, filed April 22, 1936, by George E. Inman (both being assigned to the same assignee as the present application). The ends of the tube are closed by discs 14, consisting of chrome-iron alloy, or other suitable material, which are sealed to the glass wall. On the recessed, inwardly-protruding portion 15 of these discs are mounted support wires 16, one end of which encircles the portion 15, as indicated at 17, and being held in place by spring pressure and friction. The disc shown in detail at the left-hand end of the lamp has an opening through which the lamp envelope is exhausted and filled with a suitable gas, the opening being finally sealed by a plug 18 of glass. To facilitate starting, a strip 19 of conductive material, is applied externally on the envelope from one electrode to the vicinity of the other electrode.

The envelope, after exhaust, is provided with a charge of rare gas, such as argon, krypton, neon, or xenon, at a pressure within the range of about one to ten millimeters of mercury, a pressure of eight millimeters being suitable.

The fluorescent material of activated magnesium silicate is uniformly applied to the interior of the container as indicated by the stippled coating 20 to form a thin, light-transmitting layer. The coating may be applied by means of a bond or may be imbedded in the glass by heating the glass to its softening temperature. As bonding agent we may use glycerine, a mixture of glycerine and 20 per cent boric acid, potassium silicate, castor oil, or phosphoric acid.

When subjected to the radiation from the positive column discharge in the rare gas, the magnesium silicate emits bright red light by fluorescence. This fluorescence is surprising as no fluorescent effects are produced when this material is subjected to radiation from a mercury vapor quartz lamp.

The fluorescent material embodying our invention also may be modified by substituting other metal oxides, for example, zinc oxide for part of the magnesium oxide. Zinc silicate is especially well adapted for use as a fluorescent material in the presence of mercury vapor discharge, the light emitted by it being predominantly green. Mixed, activated compositions of magnesium and zinc with silica fluoresce with various pleasing combinations of green and red in the presence of the short wave length radiations emitted by discharge in rare gases.

It is, of course, essential for maximum efficiency that the excitation range of the fluorescent powder should coincide with spectral energy characteristics from the discharge in the rare gas, that is, same prominent lines in the discharge should be within the spectral region efficient for the excitation of the powder. This condition is fulfilled in neon or argon discharges for magnesium silicate with or without zinc replacing the magnesium.

A wide range of fluorescent colors is obtained by varying the ratio of the zinc oxide to the magnesium oxide, that is, from the red region when the magnesium oxide is the main basic constituent, through a yellow to the green region as the zinc oxide becomes predominant. This is an unexpected effect as such changes of color heretofore have not been obtained by fluorescent effects in mercury vapor discharges.

What we claim as new and desire to secure by Letters Patent of the United States is:

1. A fluorescent material comprising heat-treated magnesium oxide, silica and an exciter.
2. A fluorescent material comprising a heat-treated mixture of magnesium oxide, silica and an exciter.
3. A fluorescent material comprising the heat-treated combination of magnesium oxide, silica and manganese compound.
4. A fluorescent material comprising a heat-treated oxygenous material containing in chemical combination magnesium and silicon and a relatively minor proportion of an exciter.
5. A fluorescent material comprising the heat-treated combination of magnesium oxide, zinc oxide, silica and manganese compound.
6. A fluorescent material which is capable of emitting light in the red spectral range when subjected to a positive column gas ionization discharge comprising a heat-treated product of magnesium oxide and silica intermingled in molecular proportions by weight, said product being associated with a minor proportion of manganese compound.

GORTON R. FONDA.
RALPH P. JOHNSON.